March 17, 1959    J. L. BARKER ET AL    2,878,467
APPARATUS FOR DETECTING AND MEASURING THE SPEED OF
MOVING OBJECTS BY MEANS OF RADIO WAVES
Filed Jan. 21, 1954    2 Sheets-Sheet 1

INVENTORS
JOHN L. BARKER
BERNARD J. MIDLOCK
BY
ATTORNEY

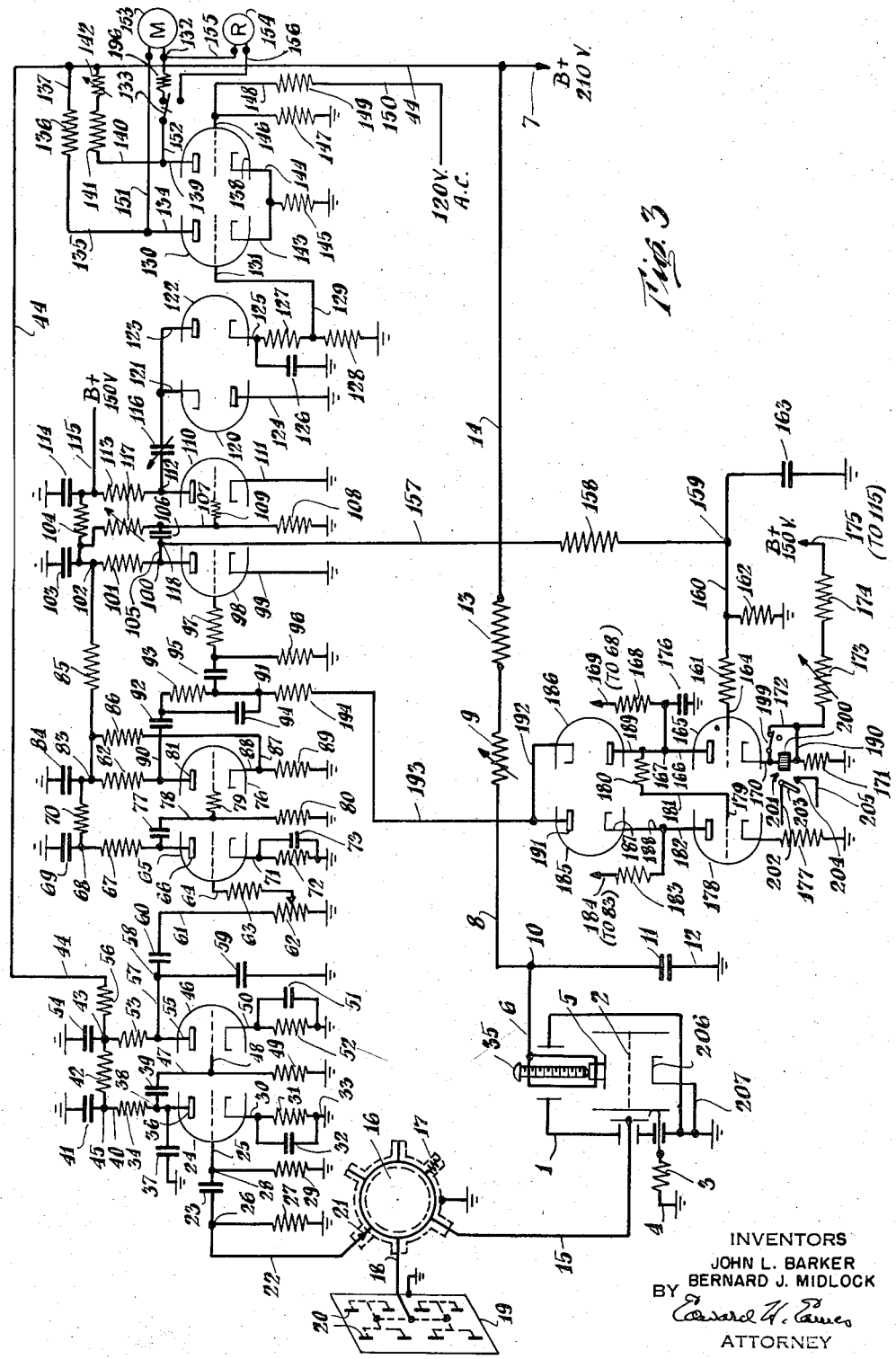

United States Patent Office 2,878,467
Patented Mar. 17, 1959

2,878,467

APPARATUS FOR DETECTING AND MEASURING THE SPEED OF MOVING OBJECTS BY MEANS OF RADIO WAVES

John L. Barker and Bernard J. Midlock, Norwalk, Conn., assignors to Eastern Industries, Incorporated, East Norwalk, Conn., a corporation of Delaware Application January 21, 1954, Serial No. 405,331

16 Claims. (Cl. 343—8)

This invention relates to a device for detecting and measuring the speed of moving objects. It is especially adapted to be utilized for measuring the speed of vehicles on a roadway. It may, however, also be used for determining the speed of trains or other railroad vehicles moving on a railroad track or for measuring the speed of any other type of traffic.

In general, this invention utilizes a beam of radio waves generated by the circuit of the invention and transmitted by a directional antenna in a direction parallel to or at a slight angle to the line of direction of the particular vehicle in question. These radio waves are reflected back to the sending unit by the vehicle and are received by the same antenna. The motion of the vehicle causes a varying time lag between the receipt by the antenna of the individually reflected waves. In short, a Doppler effect results from the motion of the particular vehicle in question. By mixing a portion of the original signal at the frequency transmitted with the signal received by the antenna a beat frequency is obtained which is proportional to the speed of the vehicle. The frequency of this latter signal may be converted by the circuit of this invention into miles per hour or other convenient units.

Among the advantages and objects of this invention are the provisions for an improved device for detecting the presence and speed of a moving vehicle in a traffic path from a point adjacent such path, by remote detection.

Another object of this invention is to provide an electrical circuit which gives more accurate readings than do the presently known devices of this general type.

A further object of this invention is to provide a device for this purpose which can utilize a single antenna rather than requiring separate sending and receiving antennae. As a result the unit may be more compactly built for greater portability and an antenna structure may be used which is more directional in nature and transmits a narrower beam of waves.

An additional object of this invention is to provide a device for detecting the speed of moving vehicles which more readily distinguishes between two vehicles located relatively close to each other and so has enhanced accuracy.

Another object of this invention is to provide for an improved circuit for clamping out signals below the desired threshold value of the speed indicating signal thus eliminating responses to noises and increasing the accuracy of the device.

Another object of this invention is to provide a circuit to increase the accuracy and response of any recording device connected to the circuit.

Other and further advantages of this invention will be seen in the following description of the device and the appended drawings.

These drawings are:

Fig. 3 is a circuit diagram showing the specific operation of the device.

Figure 1:
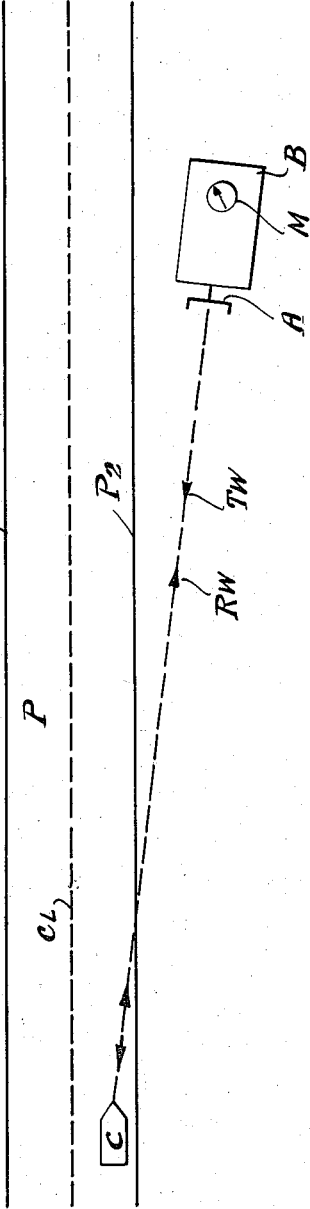
Fig. 1 is a plan view of a highway showing in general the operation of the device in question.

Turning to Fig. 1 we see a highway P with edges P1 and P2 and a center line CL. In the lower left corner is a representation of a vehicle marked C. This vehicle is moving in a direction from left to right in this figure and is in its right-hand lane. The structure of this invention is shown located in a box B having an outside antenna A and a meter thereon M. The device B is located in this instance close to the side of the highway (for clarity its size and position are much out of proportion to the size of the car and the highway). The transmitted waves sent by the device leave the directional antenna A and go to vehicle C as shown by the dotted line. A portion of these waves is reflected back to the antenna along this same path. These waves are indicated by the letters TW and RW respectively.

As can be seen from this drawing, when the vehicle C is moving in a direction generally toward or away from the structure B there will be a Doppler effect created and the reflected waves will be of slightly different frequency from the frequency of the transmitted waves.

The frequency of a radio wave received, as compared to the transmitted frequency, can be expressed by the following formula:

$$F_r = \frac{c+v}{c-v} F_t$$

where:

$F_r$ is the received signal frequency
$F_t$ is the transmitted frequency
$c$ is the velocity of light
$v$ is the velocity of the target The receiver measures the Doppler or difference frequency ($F_d$) between the transmitted and the received frequencies. This can be expressed by subtraction and a rearrangement of the above equation as follows:

$$F_d = \frac{2v}{c-v} F_t$$

The above formula is specifically true only when the direction of movement of the target is in the same direction as the shortest distance between the transmitter-receiver and target. An angle between the two directions requires a cosine factor for the more general solution. The cosine of the angle less than 10 degrees, however, yields an accuracy within 2%; this factor can therefore be dropped. Also, since the relative velocity of the target to that of light is exceedingly small, the formula can be simplified to the following:

$$F_d = \frac{2v}{c} F_t$$

since:

$$\lambda = \frac{c}{F_t}$$

the wave length of the transmitted radio wave
then:

$$F_d = \frac{2v}{\lambda}$$

With speeds expressed in miles per hour and wave lengths in centimeters, the Doppler frequency becomes:

$$F_d = \frac{89.4v}{\lambda}$$

Rearranging, we get speed in terms of the Doppler shift as follows:

$$V = \frac{F_d \lambda}{89.4}$$

In the device of this invention the preferred generated frequency for the transmitted waves is 2455 megacycles. Therefore the velocity of the vehicle will be given by the equation:

$$V = \frac{F_d}{7.31} \text{ M. P. H.}$$

The velocity of the vehicle as calculated by the above formula may be read on the meter M shown in Fig. 1, once the meter has been properly calibrated. If desired, a recorder of any conventional type may be used instead.

Figure 2:
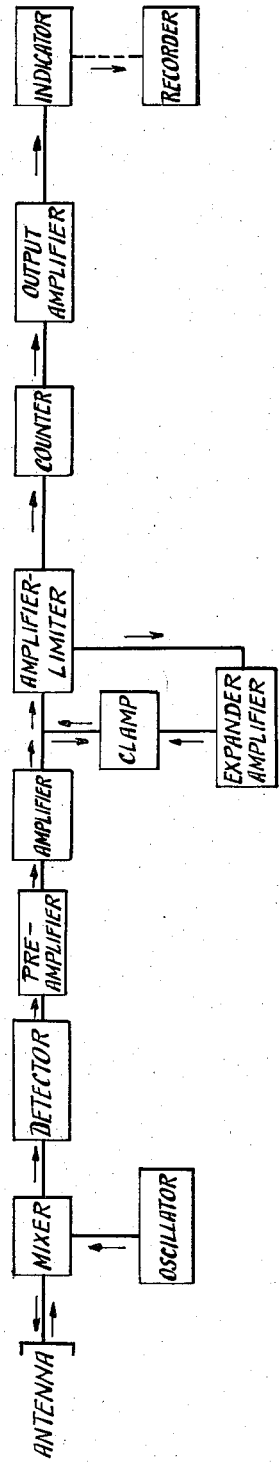
Fig. 2 is a block diagram showing the principal electrical circuit parts making up the invention.

Fig. 2 is a block diagram disclosing the general circuit arrangement of the invention. At the left is an oscillator which generates an electrical signal of the desired frequency. This signal is led to a mixer from which a portion goes to the antenna and is transmitted. The reflected signal is received on this same antenna and is returned to the mixer where it is combined with a portion of the signal coming from oscillator 1, and the resulting beat frequency is detected. This beat frequency goes through several amplification stages represented by the preamplifier, the amplifier, and the amplifier limiter. The latter limits the amplitude of the beat frequency signal so that the signal going from there to the counter is always at the same amplitude when speeds are being measured by this device. The counter which receives the limited beat frequency signal from the amplifier limiter is in effect a frequency measuring circuit and produces an output voltage proportional to the beat frequency. Accordingly, upon proper calibration, this voltage will indicate the speed of the moving vehicle.

The voltage from the counter goes to the output amplifier which is in effect a vacuum tube voltmeter with certain modifications, to be hereinafter described. The output of this is led to an indicator or meter or, if desired, a recording device indicated by the dotted connection from the indicator to the recorder. If desired, of course, the recorder may be connected directly to the output amplifier with suitable matching of impedances.

Connected to the amplifier limiter is the expander amplifier and clamp which together serve to noticeably reduce the input to the amplifier limiter when the reflected signal received by the antenna is below a certain predetermined minimum amplitude, thus causing the circuit to be non-indicating when noise or other factors could serve to cause inaccuracy in the readings. Except for the expander amplifier and clamping circuit, inaccuracy would result where the signal input to the amplifier limiter was insufficient to drive the limiter to its predetermined limits, consequently allowing for frequency measurement of output signals less than the specified limited amplitude.

The expander amplifier takes a signal from the amplitude limiter, amplifies it and utilizes it to operate the clamp circuit. This clamp circuit in effect switches a secondary load resistor in the amplifier circuit in and out of the latter circuit. When the clamping circuit is in the condition connecting in the load resistor, the gain of the amplifier is much reduced. This occurs in instances where the input signal is too weak to give accurate readings and by this reduction in amplification reduces the speed reading to zero. When the clamping circuit is in effect disconnected, i. e. when the input is of sufficient strength, then the amplifier will have its normal gain and the circuit will operate in the usual way.

Fig. 3 shows in greater detail the specific operation of the circuit of the invention. In the lower left hand corner high frequency cavity oscillator 1 is shown. This oscillator has grid 2 connected through resistance 3 and lead 4 to ground. Cathode 206 is connected via lead 207 to ground. Anode 5 has the adjusting screw 35 and is connected through lead 6, junction 10, lead 8, variable resistance 9, resistance 13, and lead 14 to a source of positive potential 7. This source is preferably of a voltage regulated type and has a potential of 210 volts. Being of the usual nature, the plate voltage supply circuits are not disclosed. Plate 5 is also connected through lead 6, junction 10, condenser 11, and lead 12 to ground. Preferably oscillator tube 1 is of type 2C40 and operates at a frequency of 2455 megacycles.

The generated output signal of tube 1 is carried by lead 15 to the mixer 16. Mixer 16 is of the ring junction type and has adjusting resistance 17. Resistance 17 is of the ultra-high frequency disc type and is selected as to value to balance the antenna load and to set the mixer for the best signal to noise ratio. Approximately one-half of the energy from the oscillator is transmitted from this directional mixer through lead 18 to antenna 19.

Antenna 19 is preferably of an eight-element arrangement, two of the elements being indicated by the number 20. Since by this invention the entire antenna, that is all eight elements, may be utilized both in transmitting and in receiving at the same time, the width of the transmitted beam is much reduced from that found in prior devices without increasing the area of the total antenna assembly itself. It has been found that an effective beam width of about 20° between half power points can be obtained. As a result the reading of the speeds in a particular traffic stream can be more readily distinguished from other traffic streams nearby as, for example, in distinguishing between traffic approaching on one side of the roadway and traffic departing on the other. Further, a better concentration of the available power in this narrower zone is obtained.

The signal transmitted by antenna 19 may be reflected by a vehicle and a portion of the reflected wave received by this same antenna. The received signal is fed into ring junction mixer 16 by lead 18 and is there mixed with a portion of the generated signal which has been introduced into the ring 16 through lead 15. When the vehicle creating the reflected signal is in motion, the received signal will be of a slightly different frequency than the generated and transmitted signal, as has been previously described. Consequently a beat frequency will be produced. This beat frequency is detected by detector 21, shown in one output junction of ring 16. The detector is preferably of the crystal type 1N21B. In effect, the detector compares a portion of the transmitted signal with the received signal and by heterodyne action produces the difference frequency which in this case is the Doppler frequency resulting from the speed of the vehicle.

The detected beat frequency is carried by lead 22 through capacitance 23 and lead 25 to the grid of triode 24. Condenser 23 is connected to ground through resistances 27 and 29 as shown in Fig. 3. Cathode 30 of triode 24 is connected to ground through the parallel condenser 32 and resistance 31 and lead 33. The plate supply voltage for triode 24 comes from supply 7, previously described, through lead 44, resistance 56, junction 43, resistance 42, junction 45, lead 40, resistance 34 and junction 38 to plate 36. The plate supply is by-passed by condenser 41 connected between junction 45 and ground; and a high frequency filter is provided at plate 36 by condenser 37 to ground.

The amplified output of triode 24 is fed into the grid 48 of triode 46 for further amplification. This coupling is made through junction 38, condenser 39, and lead 47 to grid 48. Grid 48 is grounded through resistance 49.

The plate supply voltage for triode 46 comes from supply 7 through lead 44, resistance 56, junction 43, and resistance 53 to plate 55. The cathode 50 of triode 46 is grounded through parallel resistance 52 and condenser 51. The plate circuit of the triode includes resistance 53 connected through junction 43 and condenser 54 to ground. It is also connected through lead 57, junction 58, and condenser 59 to ground.

The output of triode 46 is coupled to triode 65 through lead 57, junction 58, condenser 60, lead 61, the tapped portion of resistance 62, and resistance 63 to grid 64. Resistance 62 is connected between lead 61 and ground and acts as a voltage divider, serving as a gain control for the amplifier.

The spacing of the several input and output junctions of the mixer 16 are about one-quarter wave length apart for the transmitted frequency, so that detector 21 is approximately one-half wave length from the junction at input lead 15 in the shortest direction and approximately one wave length in the other direction around the ring, and the junction of the antenna lead 18 is mid-way between the junction of detector 21 and the input lead 15. Consequently, the signals arriving at detector 21 from lead 15 in the two directions are substantially 180° out of phase, leaving only a small percentage of the original signal derived from lead 15 to mix with the energy received from the antenna. The signals received at detector 21 from the antenna in opposite directions around the mixer are in phase.

Triodes 24 and 46 and their associated circuits constitute the preamplifier stages previously referred to. Triodes 65 and 76 and their associated circuits make up the amplifier stages.

Triode 65 has its cathode 71 connected to ground through parallel condenser 73 and resistance 72. The plate supply voltage for this tube comes through plate supply lead 115, shown toward the top of the drawing near the right. This supply is preferably 150 volts D. C. and voltage regulated. Supply lead 115 is connected to plate 66 through resistance 104, junction 102, resistance 85, junction 83, resistance 70, junction 68, and resistance 67. Condenser 69 is connected from junction 68 to ground. The amplified output of triode 65 is impressed upon the grid of triode 76 through condenser 77, lead 78, and resistance 79. A circuit leads from plate 66 through condenser 77, lead 78 and grid-return resistance 80 to ground.

The plate supply for triode 76 comes from lead 115 through resistance 104, junction 102, resistance 85, junction 83 and resistance 82 to plate 81. Grid bias is obtained by applying a positive potential to cathode 88 of triode 76 from junction 83 through resistance 86 and lead 87 in conjunction with grounded resistance 89; resistances 86 and 89 serve as a voltage divider.

Condenser 84 is connected between junction 83 and ground and serves as a decoupling filter condenser for plate supply for tube 76.

The amplifier limiter circuit previously described is that circuit associated with triodes 98 and 110.

The output of triode 76 is impressed upon triode 98 through lead 90, condenser 92, resistance 93, condenser 95, and resistance 97. Condenser 95 also leads to ground through resistance 96. Condenser 94 is in parallel with resistance 93. The cathode of triode 98 is grounded through lead 99. The plate voltage supply to triode 98 comes from lead 115 through resistance 104, junction 102, resistance 101, and junction 100. Plate supply decoupling is provided by condenser 103 connected between junction 102 and ground. The output of triode 98 is fed into the grid of triode 110 through lead 105, junction 118, condenser 106, lead 107, and resistance 109. The grid of tube 110 is given a bias from plate supply lead 115 through resistance 104, resistance 117, lead 107, and resistance 108 to ground. Grid resistance 109 is connected, as previously stated, to lead 107. The cathode of triode 110 is grounded through lead 111. The plate of triode 110 is connected via junction 112 and load resistance 113 to the plate supply lead 115. Filtering for the plate supply is provided by by-pass condenser 114 connected between lead 115 and ground.

The previously referred to counter circuit is the frequency measuring circuit represented by diodes 120 and 122, variable condenser 116, and resistances 127 and 128.

The plate of triode 110 is connected through junction 112, condenser 116, and lead 121 to the cathode of diode 120. Condenser 116 is also connected to the plate of diode 122 through lead 123. The anode of tube 120 is grounded through lead 124. The cathode of tube 122 is connected to junction 125; and condenser 126 provides a by-pass from junction 125 to ground. Junction 125 is also connected through series resistances 127 and 128 to ground. As will be described below, the D. C. voltage obtained on lead 129, which is connected between the resistances 127 and 128, is proportional to the frequency obtained at junction 112 from the limiter tube 110. As has previously been described, the frequency of the output signal of limiter 110 is the beat frequency obtained by detector 21 of mixer 16.

Triodes 130 and 138 and their associated circuits constitute the output amplifier previously referred to and are in essence a modified form of vacuum tube voltmeter. The potential on lead 129 is applied to grid 131 of tube 130. The cathode of this tube is connected through lead 143 and resistance 145 to ground. The plate of triode 130 obtains its plate supply voltage through leads 134 and 135, resistance 136, lead 137, and lead 44 which is connected to the supply 7. The cathode of triode 138 is connected through lead 144 and resistance 145 to ground. The plate of that triode obtains its supply voltage through leads 139 and 140, resistance 141, variable resistance 142, and lead 44 connected to supply 7. The grid 146 of triode 138 is connected through resistance 147 to ground. It is also connected through lead 148, resistance 149, and lead 150 to a 120 volt source of alternating current for a purpose to be later described.

The output of this voltmeter circuit is applied to meter 153. One terminal is connected through lead 151 and 134 to the plate of tube 130. The other terminal is connected through junction 132, resistance 196, switch 133, leads 152 and 139 to the plate of tube 138. Recorder 154 may be connected in series with meter 153 by moving switch 133 to its lower position to connect lead 152 to lead 156 and via recorder 154 and lead 155 to junction 132, which disconnects the impedance-matching resistance 196. Switch 133 could alternatively be a set of auxiliary make-break contacts in a plug-jack connection for the recorder, automatically operated by plugging in the recorder. Switch 133 could also alternatively be the moving contact of a relay and operated by a relay coil, in turn controlled by connection of the recorder 154, as by power fed out through one of an auxiliary pair of jack-contacts and a cooperating auxiliary pair of strapped contacts on the recorder plug and back through another of the auxiliary pair of jack contacts in series through the relay coil, if a four pin plug-jack connection is used at the recorder terminals for example.

Triodes 165 and 178 and their associated circuits constitute the expander amplifier previously referred to. Diodes 185 and 186 and their circuits are the clamp circuit. Triode 165 is controlled by the output voltage of tube 98 of the limiter circuit. This connection is made from the plate of tube 98 through junction 100, lead 105, junction 118, lead 157, resistance 158, junction 159, lead 160, and resistance 161 to grid 164 of triode 165. Junction 159 is by-passed to ground through condenser 163 and also connected through lead 160 and resistance 162 to ground. The plate voltage for triode 165 comes through lead 166, junction 167, resistance 168, and lead 169 which, though not shown is connected to junction 68 (located above tube 65). Junction 68, as previously described, is connected to the lead 115 through intermediate components. Triode 165 is biased by the connection of its cathode 170 to a voltage divider; that is, cathode 170 is connected through switch 199, lead 172, variable resistance 173, resistance 174, and lead 175 to plate supply lead 115. Adjustment of bias for different tubes may be made with variable resistance 173. The cathode 170 is also connected through switch 199, lead 172, lead 190, and resistance 171 to ground. If switch 199 is opened, however, the coil 200 of the normally-open-contact relay 201 is in series between cathode 170 and resistance 171.

Consequently, a positive bias is given to the cathode. The plate circuit of tube 165 is by-passed to ground through condenser 176.

The other portion of the expander amplifier circuit utilizes triode 178 which is controlled by the connection of its control grid 179 to the plate of triode 165 through lead 181, resistance 180, junction 167, and lead 166. Its cathode is grounded through resistance 177. The plate supply voltage for triode 178 is through lead 182, resistance 183, and lead 184 which is connected to junction 83 (above triode 76), previously described.

As will be described below, the expander amplifier circuit is controlled by the amplitude of the signal in the output of tube 98 of the limiter circuit. The expander amplifier circuit itself controls the clamping tube circuit, made up of diodes 185 and 186. This latter circuit when conducting bleeds off to ground most of the output signal of tube 76.

The clamping diodes 185 and 186 are connected between resistor 194 (one of the load resistors of triode 76) and ground through triodes 178 and 165, respectively. Thus, resistor 194 is connected between junction 91 and the plate 191 of diode 185 by lead 193. Lead 193 is also connected through lead 192 to the cathode of diode 186. The plate of tube 186 is connected through lead 189, junction 167, and lead 166 to the plate of triode 165. The cathode 187 of tube 185 is connected through leads 188 and 182 to the plate of tube 178.

The heater circuits utilized are of the usual nature and, therefore, not shown in the figures.

The operation of this circuit is as follows:

In the usual manner a high frequency signal is generated by cavity oscillator 1, the frequency of which can be adjusted through the screw of plate 5. Power output of this oscillator may be adjusted by means of variable resistance 9. The output of this oscillator is carried by lead 15 into the mixing ring junction 16. A portion of this signal is carried from the mixing ring junction 18 to the directional antenna 19 and transmitted down a highway or other traffic lane. In the event that a vehicle is in the path of transmission, this transmitted wave will be reflected and a portion of the reflected wave will be received by antenna 19. This received wave is carried by lead 18 back into mixing ring 16. If the vehicle is motionless, the frequency of the reflected wave will be the same as that of the transmitted wave. If the vehicle is in motion, there will be a variation in frequency, in accordance with the previously given equation. For a transmitted frequency of 2455 megacycles, this beat frequency will range from zero to approximately 731 cycles for a vehicle speed of 0 to 100 miles per hour. The beat frequency obtained in the mixer will be detected at crystal 21. That beat frequency signal is carried through lead 22 into the pre-amplification circuit.

The two amplification stages represented by tubes 24 and 46 are of the usual resistance-capacity coupled type and are tuned to carry frequencies within the anticipated beat frequency range. Thus, the beat frequency signal in lead 22 is amplified by tube 24 and again amplified by tube 46. The amplified signal from tube 46 is again amplified in the two amplifier stages represented by tubes 65 and 76, once again coupled in the usual resistance-capacity coupling means. Thus, the signal from triode 24 passes through junction 38, condenser 39, and lead 47 to the grid of tube 46. The signal from tube 46 goes from the lead 57 to the junction 58, condenser 60, lead 61, resistance 62, and resistance 63 to grid 64. The output from this triode is again amplified in the second amplification stage tube 76. The output of triode 65 goes through condenser 77, lead 78, and resistance 79 to the grid of tube 76.

Frequencies substantially above 731 cycles per second are attenuated by filter condensers 37 and 59.

Tubes 98 and 110 represent the limiting stages. The output from triode 76 goes from plate 81, lead 90, condenser 92, resistance 93, condenser 95, and resistance 97 to the grid of triode 98, where it is again amplified. If the signal is large enough, it will be limited by this tube. It will be limited in addition by the second limiter tube 110. As will be explained later, if any signal is received above the desired threshold amplitude, the expander amplifier in conjunction with the clamp circuit will drive both limiters to full limiting action. The grid of tube 110 is given a positive bias through its connection with the plate voltage supply lead 115 and the series of voltage-dividing resistances 104, 117 and 108 as shown in Fig. 3. Thus, in instances where the signal applied to grid resistance 109 is positive, the signal will be absorbed in the grid resistor and will not appear in the output, thus limiting the magnitude of the output signal during this positive phase of the input cycle. For negative input signals the tube will be driven to cut-off and so limit the amplitude of the output.

The function of the positive bias on the grid of tube 110 is to absorb in grid resistor 109 any small signals or noise voltages. When the signal is of sufficient amplitude to cause tube 98 essentially to approach full limiting this small bias is overcome, and by the previously described expander amplifier and clamp control, both tubes are driven to full limiting. After the signal has operated at full limiting for correct reading and the input signal amplitude falls as a car passes out of range, tube 98 will no longer be driven to full limiting, although tube 110 will be at full limiting until the expander amplifier and clamp circuit switches to sub-threshold operation. The input signal must drop considerably below the initial threshold clamp release value before the clamp restoration point is reached, as controlled by the average anode voltage of tube 98, a part of which is impressed on the grid of tube 165, as more fully described below.

The condenser 94 tends to reduce the potential divider ratio to allow slightly more signal to be fed to the limiter 98 for the higher frequencies of the speed range. This causes the speed meter to switch to its indicating condition for higher speed approaching vehicles earlier, or in other words at greater distance range.

This same feature of reaching out further for higher speed cars is further enhanced by placing a slope gain characteristic on the amplifier by providing only partial by-pass of cathode resistor 72 by a relatively small by-pass condenser 73 such as 0.1 mfd. If it is desired however to provide a flatter response over the speed range of the apparatus, the condenser 73 may be increased to 100 mfd. for example, and the condenser 94 may also be omitted if desired.

The frequency counting or measuring circuit is that associated with diodes 120 and 122. The output from triode 110, which will be rectangular in form, is carried from the plate through junction 112 to variable condenser 116 where it is differentiated and connected by lead 121 to the cathode of diode 122. The charging of capacitor 116 through the load resistors 127 and 128 will produce a current which is proportional to the frequency of charging the condenser, the capacitance, and the potential applied to it. The condenser will be charged through diode 122 and discharged through diode 120.

Since the current passing through resistances 127 and 128 is proportional the frequency output of the limiter tube 110, and since the amplitude of the output signal from tube 110 is maintained constant, it follows that the voltage drop across resistance 128 will be proportional to the frequency. Since, as has been described above, this frequency is proportional to the speed of the vehicle in question, the voltage potential upon lead 129 is proportional to the speed of the vehicle. Capacitance 126 in conjunction with resistances 127 and 128 serves to integrate the pulse output of condenser 116 to produce this speed proportioned D. C. voltage.

Tubes 130 and 138 make up a vacuum tube voltmeter circuit for the purpose of amplifying and measuring the voltage on lead 129. The output of this circuit is applied to leads 151 and 152. This voltage can be read on meter 153 or a permanent record of it may be made on recorder 154. Preferably, of course, meter 153 and recorder 154 will be calibrated in miles per hour. At the option of the user either the meter alone or the recorder and meter together may be used at a given time. In the former case resistance 196 substitutes for the impedance of the recorder.

An additional feature of this invention resides in the application of a small A. C. voltage to the grid 146 of triode 138 of the voltmeter circuit. This voltage is applied from a source, not shown, through the voltage-divider circuit made up of lead 150, resistance 149, lead 148, and grounded resistor 147. Lead 148 connects to grid 146. The result will be a reduction in the time response of the recorder when it is used. This occurs because the slight alternation in the output voltage applied to the recorder pen element serves to shake the pen slightly to counteract the static friction of the pen on the paper. It will be noted that application of the alternating current voltage in this manner requires no additional leads from the voltmeter circuit to the recorder circuit.

The expander amplifier and clamp circuits serve to assure the operator that the limiting tubes 98 and 110 are actually being driven to their limit, thus preventing error in the counting circuit. This result is effected by shunting to ground the major part of the output of triode 76 in instances where the output of the limiter tubes is less than the full limiting amplitude.

When the expander circuit is operating under no signal or the reduced gain condition, resistance 93 (with parallel condenser 94) and resistance 194 load the output of tube 76 and comprise a potential divider for this output, thus supplying only a portion of the available signal to the input of tube 98. When the expander is in its higher gain condition, that is, when the beat frequency signal is of sufficient amplitude, resistance 194 is switched out of the circuit, thereby allowing tube 76 to operate at a higher output and rendering the divider essentially inoperative.

Resistance 194 is switched in and out of the circuit by means of the D. C. potential applied to the clamping tubes 185 and 186. In the higher gain or signal condition the cathode of tube 185 is highly positive and the anode of tube 186 is highly negative. Diodes 185 and 186 therefore will not conduct, and, accordingly, resistance 194 is essentially disconnected. In the low gain or no signal condition cathode 187 and anode 189 are essentially of the same potential, and, therefore, these diodes will pass current regardless of the polarity of the signal in the plate circuit of tube 76. This means that resistor 194 is in effect connected into the circuit.

The correct potentials for shifting the clamping tubes 185 and 186 in or out is secured from the direct current amplifier composed of tubes 178 and 165. For the reduced gain or no signal condition tube 165 is essentially non-conducting due to the bias of that tube. Therefore, the potential of its anode is highly positive, and, accordingly, the anode of tube 186 is highly positive. The anode of tube 165 is coupled through lead 166, junction 167, resistance 180 and lead 181 to the grid 179 of tube 178. Therefore, when the anode of tube 165 is positive, tube 178 will conduct and the potential of its anode will be reduced to a relatively low value. Consequently, cathode 187 of tube 185 will be also of low potential as is desired.

Upon receipt of sufficient signal to insure accuracy in the reading, i. e. to insure that the limiter is driven to its full scope, there is a positive shift in the plate voltage of tube 98. This signal is applied, as was the previous one, through the voltage divider circuit made up of junction 100, lead 105, junction 118, lead 157, resistance 158, junction 159, lead 160, and resistance 162, the voltage across resistance 162 being applied via resistance 161 to the grid 164 of tube 165. The A. C. current of this applied signal is filtered out by means of capacitor 163 connected between junction 159 and ground. This positive signal applied to the grid of tube 165 causes the tube to become conducting, therefore reducing its anode potential. It likewise, through the connection between grid 179 and the plate of tube 165, causes tube 178 to become less conducting, thereby raising the anode potential of the latter. This, in effect essentially disconnects the clamping diodes 185 and 186 and, consequently, resistance 194 from the circuit. As a result the output of triode 76 is no longer divided with resistance 194, and thus a greatly increased signal is applied to limiters 98 and 110. Variable resistance 173 provides means whereby the correct amount of signal voltage will cause the tube 165 to become conducting and thereby to operate the expander.

For the purpose of the above description of the circuit operation it has been assumed that the switch 199 has been closed. If this switch is opened, then relay 201 will be energized when tube 165 is conducting. This occurs when there is a vehicle within the range of the transmitter-receiver unit. Closing of the relay contacts 203, 204 may serve to actuate any desired warning signal, traffic control mechanism, or the like. If it is desired to operate the circuit of this invention solely as a vehicle detector, then the portion of the circuit (except for the plate supply voltages) to the right of junction 118 in Fig. 3 may be omitted.

In Fig. 3 tubes 24 and 46 may be of the double triode type 12AX7; tubes 65 and 76 may be of the double triode type 12AU7; tubes 98 and 110 may be of the double triode type 12AU7; tubes 120 and 122 may be of the double diode type 6AL5; tubes 130 and 138 may be of the double triode type 12AU7; tubes 165 and 178 may be of the double triode type 12AU7; tubes 185 and 186 may be of the double diode type 6AL5. In this figure also resistance 3 may be of 2000 ohms, resistance 9 of 0 to 3000 ohms, resistance 13 of 1000 ohms, resistance 17 of 50 ohms (disc type), capacitor 23 of 0.5 mfd., resistance 27 of 510 ohms, resistance 29 of 2000 ohms, resistance 31 of 12,000 ohms, capacitor 32 of 100 mfd., capacitor 37 of 0.0005 mfd., capacitor 39 of 0.01 mfd., capacitor 41 of 20 mfd., resistance 42 of 150,000 ohms. Resistance 49 may be of 1 megohm, capacitor 51 of 100 mfd., resistance 52 of 8,200 ohms, resistance 53 of 200,000 ohms, capacitor 54 of 10 mfd., capacitor 59 of 0.001 mfd., capacitor 60 may be of 0.05 mfd., resistance 62 may be of 150,000 ohms, resistance 63 of 510,000 ohms, resistance 67 of 200,000 ohms, capacitor 69 of 8 mfd.

Resistance 70 may be of 51,000 ohms, resistance 72 of 8,200 ohms, capacitor 73 of 0.1 mfd., capacitor 77 of 0.05 mfd., resistance 79 of 510,000 ohms, resistance 80 of 510,000 ohms, resistance 82 of 200,000 ohms, capacitor 84 of 8 mfd. Resistance 85 may be of 27,000 ohms, resistance 86 of 100,000 ohms, resistance 89 of 2,000 ohms, capacitor 92 of 0.05 mfd., resistance 93 of 200,000 ohms, capacitor 94 of 0.0005 mfd., capacitor 95 of 0.05 mfd., resistance 96 of 1 megohm, resistance 97 of 1 megohm, resistance 101 of 51,000 ohms, capacitor 103 of 8 mfd., resistance 104 of 10,000 ohms, capacitor 106 of 0.002 mfd. Resistance 108 may be of 1 megohm, resistance 109 of 8 megohms, resistance 113 of 100,000 ohms, capacitor 114 of 0.2 mfd., capacitor 116 of 100 mmfd., resistance 117 of 3.9 megohms. Capacitor 126 may be of 0.1 mfd., resistance 127 of 500,000 ohms, resistance 128 of 500,000 ohms, resistance 136 of 10,000 ohms, resistance 141 of 8,500 ohms. Resistance 142 may be of 3,000 ohms, resistance 145 of 390 ohms, resistance 147 of 510 ohms, resistance 149 of 150,000 ohms, resistance 158 of 820,000 ohms, resistance 161 of 510,000 ohms, resistance 162 of 240,000 ohms, capacitor 163 of 0.1 mfd., resistance 168 of 270,000 ohms. Resistance 171 may be of 8,200 ohms, resistance 173 of 50,000 ohms, resistance 174 of 51,000 ohms, resistance 196 of 600 ohms, capacitor 176 of 0.1 mfd., resistance 177 of 100,000 ohms, resistance 180 of 10 megohms, resistance 183 of 100,000 ohms, and resistance 194 of 51,000 ohms.

The meter 153 may be a milliammeter of 4 ma. full scale value and the recorder 154 may have a resistance of 600 ohms. Referring to Fig. 1, the meter (and recorder, if used) may, if desired, be located remotely from device B.

It will be obvious that various modifications of the disclosed circuit and components may be made without departing from the spirit of the invention within the scope of the appended claims.

We claim:

1. A speed meter for determining the speed of a body moving along a path of travel including a unitary microwave transmitter and receiver system for directing a beam of microwaves along said path toward said moving body and for receiving microwaves reflected back along said path from said moving body, said unitary system including a single antenna for both transmitting and receiving microwaves and a ring junction mixer combining the transmitted and received waves to provide beat frequency waves having a frequency substantially proportional to and caused by the speed of such moving body along said path, a microwave detector for separating such beat frequency waves, amplifier and limiter means for such beat frequency, a clamping circuit means for by-passing a part of said amplified signal when effective, and a clamping circuit control means controlled by said amplified signal for making said clamping circuit means so effective for reducing the amplification of said amplifier means when the strength of the input signal is less than a controllable desired minimum, and speed indicating means connected to the output of said amplifier limiter means to indicate the speed of said moving body in accordance with such beat frequency.

2. A speed meter for determining the speed of a body moving along a path of travel including a unitary microwave transmitter and receiver system for directing a beam of microwaves along said path toward said moving body and for receiving microwaves reflected back along said path from said moving body, said unitary system including a single antenna for both transmitting and receiving microwaves and including means for combining the transmitted and received waves to provide beat frequency waves having a frequency substantially proportional to and caused by the speed of such moving body along said path, said combining means including a ring junction mixer, a microwave detector for separating such beat frequency waves, amplifier and limiter means for such beat frequency, a control circuit to reduce the total amplification of said amplifier and limiter means when the strength of the input signal is less than a predetermined minimum, said control circuit including an expander amplifier circuit controlled by the said amplified input signal, a resistance connectible in parallel with the load circuit of said amplifier means, a clamping circuit in series with said resistance and controlled by said expander amplifier circuit whereby said resistance is substantially disconnected when said input signal is greater than said predetermined minimum and is connected when said input signal is less than a second and lower predetermined minimum, and speed indicating means connected to the output of said amplifier limiter means to indicate the speed of said moving body in accordance with such beat frequency.

3. A speed meter for determining the speed of a body moving along a path of travel including a unitary microwave transmitter and receiver system for directing a beam of microwaves along said path toward said moving body and for receiving microwaves reflected back along said path from said moving body, said unitary system including a single antenna for both transmitting and receiving microwaves and including means for combining the transmitted and received waves to provide beat frequency waves having a frequency substantially proportional to and caused by the speed of such moving body along said path, said combining means including a ring junction mixer, a microwave detector for separating such beat frequency waves, amplifier and limiter means for such beat frequency, a control circuit to reduce the total amplification of said amplifier and limiter means when the strength of the input signal is less than a predetermined minimum, said control circuit including an expander amplifier circuit controlled by the said amplified input signal, a resistance connectible in parallel with the load circuit of said amplifier means, a clamping circuit in series with said resistance and controlled by said expander amplifier circuit whereby said resistance is substantially disconnected when said input signal is greater than said predetermined minimum and is connected when said input signal is less than a second and lower predetermined minimum, and speed indicating means connected to the output of said amplifier limiter means to indicate the speed of said moving body in accordance with such beat frequency, said speed indicating means including a recorder, means for impressing the output of said amplifier limiter means upon said recorder, and means for additionally impressing an oscillating voltage upon said recorder.

4. In combination, a means for transmitting a beam of microwaves from a test station along a path of travel toward a body moving along said path and for receiving a part of such microwaves reflected from said moving body, means for mixing said reflected waves received at said test station with a part of said transmitted waves at said test station to provide a beat frequency substantially proportional to the speed of said moving body along said path, means for translating such beat frequency output to a voltage output whose voltage is characteristic of such beat frequency, said translating means including amplifier and limiter means for said beat frequency output, clamp circuit means for clamping out a part of the amplified signal to reduce its amplitude when effective, and clamp circuit control means for switching said clamp circuit between effective and ineffective conditions in response to decrease and increase of amplitude of said signal respectively at low signal level corresponding to a desired threshold level of input signal and speed indicating means actuated by said voltage, said speed indicating means including a meter and impedance-matching resistance in series, and a recorder, each capable of being operated by said voltage output, and switch means for alternative connection of either said meter and said resistance or said meter and said recorder for operation by said voltage output.

5. In combination, means for transmitting a beam of microwaves from a test station along a path of travel toward a body moving along said path, means at said test station for receiving a part of such microwaves reflected from said moving body, means for mixing said reflected waves received at said test station with a part of said transmitted waves at said test station to provide a beat frequency substantially proportional to the speed of said moving body along said path, means for translating such beat frequency output to a voltage output whose voltage is characteristic of such beat frequency, a recorder actuated by said voltage output for making a permanent record of the speed, and said translating circuit including means for introducing a modulating oscillating voltage upon said last named voltage output, said oscillating voltage being small in comparison to said voltage output, whereby the frictional resistance of the recording element upon the recording medium is reduced.

6. In combination, means for transmitting a beam of microwaves from a test station along a path of travel toward a body moving along said path, means at said test station for receiving a part of such microwaves reflected from said moving body, means for mixing said reflected waves received at said test station with a part of said transmitted waves at said test station to provide a beat substantially proportional to the speed of said moving body along said path, means for translating such beat frequency output to a voltage output whose voltage is characteristic of such beat frequency, a recorder operable by impressed voltage, vacuum tube means for amplifying said voltage output and impressing said amplified voltage upon said recorder, and means in said amplifying circuit for impressing an oscillating voltage upon said voltage output to produce a slight oscillation of the recording element of small amount in comparison to beat frequency characterizing voltage to be recorded, for reducing the friction of the recording element on the recording medium.

7. In combination, means for transmitting a beam of microwaves from a test station along a path of travel toward a body moving along said path, means at said test station for receiving a part of such microwaves reflected from said moving body, means for mixing said reflected waves received at said test station with a part of said transmitted waves at said test station to provide a beat frequency substantially proportional to the speed of said moving body along said path, means for translating such beat frequency output to a voltage output whose voltage is characteristic of such beat frequency, a recorder operable by impressed voltage, vacuum tube means for amplifying said voltage output and impressing said amplified voltage upon said recorder, and means in said amplifying circuit for impressing an oscillating voltage upon said voltage output to produce a slight oscillation of the recording element of small amount in comparison to beat frequency characterizing voltage to be recorded, for reducing the friction of the recording element on the recording medium, said last-named means including the impressing of said oscillating voltage on a grid of said amplifying means.

8. A speed meter for determining the speed of a body moving along a path of travel including a microwave transmitter and receiver system for directing a beam of microwaves along said path toward said moving body and for receiving microwaves reflected back along said path from said moving body, and including means for combining the transmitted and received waves to provide beat frequency waves having a frequency substantially proportional to and caused by the speed of such moving body along said path, a microwave detector for separating such beat frequency waves, amplifier and limiter means for such beat frequency, a control circuit for clamping out a part of the amplified beat frequency signal to divide the input to said limiter means from the output of said amplifier means when the amplitude of the beat frequency signal is less than a predetermined minimum, and a frequency meter connected to the output of such amplifier limiter means to indicate the speed of said moving body in accordance with such beat frequency.

9. A speed meter for determining the speed of a body moving along a path of travel including a microwave transmitter and receiver system for directing a beam of microwaves along said path toward said moving body and for receiving microwaves reflected back along said path from said moving body, and including means for combining the transmitted and received waves to provide beat frequency waves having a frequency substantially proportional to and caused by the speed of such moving body along said path, a microwave detector for separating such beat frequency waves, amplifier and limiter means for such beat frequency, a control circuit to divide the input to said limiter means from the output of said amplifier means when the amplitude of the beat frequency signal is less than a predetermined minimum, said control circuit including an expander amplifier circuit controlled by said amplified input signal and a clamping circuit controlled by said expander amplifier circuit, and a frequency meter connected to the output of such amplifier limiter means to indicate the speed of said moving body in accordance with such beat frequency.

10. A speed meter for determining the speed of a body moving along a path of travel including a microwave transmitter and receiver system for directing a beam of microwaves along said path toward said moving body and for receiving microwaves reflected back along said path from said moving body, and including means for combining the transmitted and received waves to provide beat frequency waves having a frequency substantially proportional to and caused by the speed of such moving body along said path, a microwave detector for separating such beat frequency waves, amplifier and limiter means for such beat frequency, a control circuit to divide the input to said limiter means from the output of said amplifier means when the amplitude of the beat frequency signal is less than a predetermined minimum, and a frequency meter connected to the output of such amplifier limiter means to indicate the speed of said moving body in accordance with such beat frequency, said control circuit including an expander amplifier circuit controlled by the signal passing through said limiter means, an impedance in parallel with the load circuit of said amplifier means, and a clamping circuit in series with said impedance and controlled by said expander amplifier circuit whereby said impedance is substantially disconnected when said input signal is greater than a second and higher predetermined minimum and is connected to so divide the input to said limiter means when said input signal is less than said predetermined minimum.

11. In combination, means for transmitting a beam of microwaves from a station along a path of travel toward a body moving along said path and for receiving a part of such microwaves reflected from said moving body, means for mixing said reflected waves with a part of said transmitted waves at said station to derive a beat frequency signal from the motion of said body, amplifier and limiter means for said beat frequency signal, a circuit for dividing the input to said limiter means from the output of said amplifier means when connected, a clamping circuit controllable for connecting and substantially disconnecting said divider circuit selectively, and an expander amplifier circuit controlled by the amplitude of the signal passing through said limiter means for so controlling said clamping circuit for connection and disconnection of said divider circuit below and above desired determined amplitude of the signal respectively, said expander amplifier circuit including a trigger tube circuit switched between conducting and non-conducting conditions to so control said clamping circuit by such action of said expander amplifier circuit, and a relay controlled by said trigger tube circuit.

12. In combination, means for transmitting a beam of microwaves from a station along a path of travel toward a body moving along said path and for receiving a part of such microwaves reflected from said moving body, means for mixing said reflected waves with a part of said transmitted waves at said station to derive a beat frequency signal from the motion of said body, amplifier and limiter means for said beat frequency signal, a circuit for dividing the input to said limiter means from the output of said amplifier means when connected, a clamping circuit controllable for connecting and substantially disconnecting said divider circuit selectively, an expander amplifier circuit controlled by the amplitude of the signal passing through said limiter means for so controlling said clamping circuit for connection and disconnection of said divider circuit below and above desired determined amplitude of the signal respectively, said divider circuit including an impedance variable with beat frequency for providing a sloping response characteristic for the speed of said body to reduce the said determined amplitude of signal with increasing speed.

13. In combination, oscillator means for generating microwaves of constant frequency, directive antenna means for transmitting a beam of such microwaves from a test station along a path of travel toward a body moving along said path and for receiving a part of such microwaves reflected from said moving body and bearing a Doppler frequency shift substantially proportional to the speed of said body along said path, a microwave detector, ring junction mixer means for duplexing said antenna means between said oscillator and said detector at spaced junctions for using the entire said antenna means for transmitting and receiving such microwaves simultaneously and for mixing said reflected waves received at said test station with a small part of said generated waves at said detector to derive such Doppler frequency shift as the beat frequency output from such detector, amplifier and limiter means for said beat frequency output, clamp circuit means for clamping out a part of the amplified beat frequency signal to reduce its amplitude when effective, and clamp circuit control means for switching said clamp circuit between effective and ineffective conditions in response to decrease and increase of amplitude of said signal respectively at low signal level corresponding to a desired threshold level of input signal, means for translating such beat frequency output to a voltage output whose voltage is characteristic of such beat frequency, and speed indicating means actuated by said voltage.

14. In combination, oscillator means for generating microwaves of constant frequency, directive antenna means for transmitting a beam of such microwaves from a test station along a path of travel toward a body moving along said path and for receiving a part of such microwaves reflected from said moving body and bearing a Doppler frequency shift substantially proportional to the speed of said body along said path, a microwave detector, ring junction mixer means for duplexing said antenna means between said oscillator and said detector at spaced junctions for using the entire said antenna means for transmitting and receiving such microwaves simultaneously and for mixing said reflected waves received at said test station with a small part of said generated waves at said detector to derive such Doppler frequency shift as the beat frequency output from such detector, amplifier and limiter means for said beat frequency output, clamp circuit means for clamping out a part of the amplified beat frequency signal to reduce its amplitude when effective, and clamp circuit control means for switching said clamp circuit between effective and ineffective conditions in response to decrease and increase of amplitude of said signal respectively at low signal level corresponding to a desired threshold level of input signal, means for translating such beat frequency output to a voltage output whose voltage is characteristic of such beat frequency, and terminals associated with said last named means whereby said last named means may be connected to speed indicating means.

15. In a radio echo system for measuring the speed of a body moving along a path relative to an observing station and having a microwave transmitting and receiving system for directing a beam of microwaves from said station along said path towards said body and receiving back a portion of such waves reflected from such moving body and bearing a Doppler frequency shift substantially proportional to the speed of said body along such path and separating and translating the Doppler beat frequency to a speed indication, said transmitting-receiving system including in combination, an oscillator for generating constant frequency microwaves, an antenna arrray having a narrow angle for transmission and reception of microwaves along said path, a ring junction mixer for such microwaves and having several junctions for connection in spaced ring-like arrangement of a total ring length of an odd number of half wave lengths for such microwaves, a microwave beat frequency detector and an amplifying-translating circuit means therefor connected to one junction of said ring junction mixer, said oscillator being connected to another junction of said mixer spaced from said detector junction an odd number of half wave lengths in one direction around the ring and an even number of half wave lengths in the opposite direction around the ring substantially, said antenna array being connected to a third junction of said mixer an odd number of quarter wave lengths from both said detector connection junction and said oscillator connection junction, and a balancing impedance load connected to a fourth junction spaced from said oscillator connection junction the same number of quarter wave lengths as said antenna connection junction but in the opposite direction therefrom, the impedance associated with said mixer serving to balance the mixer for optimum signal-to-noise ratio at said detector, whereby the microwave energy from said oscillator will divide largely between said antenna and said load with a very small part available at the detector to beat with the received reflected microwave energy and a substantial part of the received wave energy from the antenna array will be available at the detector, and the entire antenna array will serve simultaneously both for transmission and reception of the microwave energy.

16. In combination, means for transmitting a beam of microwaves from a station along a path of travel toward a body moving along said path and for receiving a part of such microwaves reflected from said moving body, means for mixing said reflected waves with a part of said transmitted waves at said station to derive a beat frequency signal from the motion of said body, amplifier and limiter means for said beat frequency signal, a circuit for dividing the input to said limiter means from the output of said amplifier means when connected, a clamping circuit controllable for connecting and substantially disconnecting said divider circuit selectively, and an expander amplifier circuit controlled by the amplitude of the signal passing through said limiter means for so controlling said clamping circuit for connection and disconnection of said divider circuit below and above a desired determined amplitude of the signal respectively, said expander amplifier circuit including a trigger tube circuit switched between conducting and non-conducting conditions to so control said clamping circuit by such action of said expander amplifier circuit, means for translating the beat frequency output signal from said amplifier and limiter means into a voltage output having a voltage characteristic of said beat frequency, and speed responsive means controlled by said voltage output.

References Cited in the file of this patent

UNITED STATES PATENTS

| | | |
|---|---|---|
| Re. 23,403 | Barker | Sept. 4, 1951 |
| 2,063,614 | McFarlane et al. | Dec. 8, 1936 |
| 2,193,361 | Rice | Mar. 12, 1940 |
| 2,329,558 | Scherbatskoy | Sept. 14, 1943 |
| 2,402,464 | Suter | June 18, 1946 |
| 2,418,389 | Andersen | Apr. 1, 1947 |
| 2,445,895 | Tyrrell | July 27, 1948 |
| 2,593,120 | Dicke | Apr. 15, 1952 |
| 2,620,470 | Rather et al. | Dec. 2, 1952 |
| 2,629,865 | Barker | Feb. 24, 1953 |
| 2,645,769 | Roberts | July 14, 1953 |
| 2,666,132 | Barrow | Jan. 12, 1954 |

FOREIGN PATENTS

| | | |
|---|---|---|
| 585,988 | Great Britain | Mar. 4, 1947 |